United States Patent Office 3,124,574
Patented Mar. 10, 1964

3,124,574
19-HALO PREGNENES
Albert Bowers, Mexico City, Mexico, assignor to Syntex Corporation, Panama, Panama, a corporation of Panama
No Drawing. Filed May 14, 1962, Ser. No. 194,717
Claims priority, application Mexico Feb. 9, 1962
17 Claims. (Cl. 260—239.55)

The present invention relates to novel cyclopentanophenanthrene compounds and to a process for the production thereof.

More particularly the present invention relates to novel 19-halo-3-β-hydroxy-Δ$^5$-pregnen-20-one derivatives.

The novel compounds of the present invention are represented by the following formula:

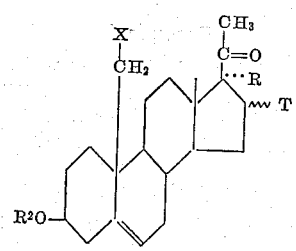

In the above formula R represents hydrogen, hydroxyl or a hydrocarbon carboxylic acyloxy group of less than 12 carbon atoms; T represents hydrogen, α-hydroxy, α-acyloxy, α-methyl or β-methyl; T and R together represent the group

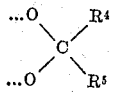

in the 16α,17α-position, wherein R$^4$ and R$^5$ each represent a lower alkyl group; X represents fluorine or chlorine and R$^2$ represents hydrogen or a hydrocarbon carboxylic acyl group of less than 12 carbon atoms.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities.

The novel compounds of the present invention are prepared by the process exemplified as follows:

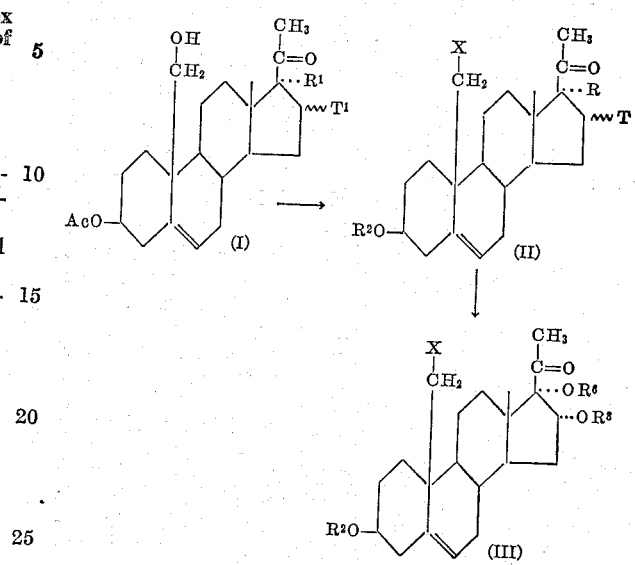

In the above formulas R, T, X and R$^2$ have the same meaning as previously described; R$^1$ represents hydrogen or a hydrocarbon carboxylic acyloxy group of less than 12 carbon atoms; T$^1$ represents hydrogen, α-acyloxy, α-methyl or β-methyl; T$^1$ and R$^1$ together represent the group

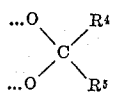

wherein R$^4$ and R$^5$ have the same meaning as set forth hereinbefore; R$^3$ and R$^6$ each represent hydrogen or a hydrocarbon carboxylic acyl group of less than 12 carbon atoms.

In practicing the process outlined above, the starting compound (I) which is a 3-acylate of a Δ$^5$-pregnene-3β, 19-diol-20-one, preferably the 3-acetate, is treated with an α-fluorinated amine, such as 2-chloro-1,1,2-trifluoro triethyl amine, in a non-polar organic solvent, to produce the corresponding 19-fluoro-Δ$^5$-pregnen-3β-ol-20-one acylate derivative (II: X=fluorine; R=R$^1$; T=T$^1$; R$^2$=acyl).

Upon conventional treatment of the starting compound (I) with tosyl chloride in pyridine, there is obtained the corresponding 19-tosylate which is treated with an alkali metal halide, such as lithium chloride or fluoride, or silver fluoride, in a suitable solvent such as dimethylformamide or acetonitrile, thus affording the corresponding 19-halo-Δ$^5$-pregnen-3β-ol-20-one acylate derivative (II: R=R$^1$; T=T$^1$; R$^2$=acyl).

The 3β and/or 17α-acyloxy-19-halo derivatives (II: R=acyloxy; R$^2$=acyl) are conventionally saponified with a base to the corresponding 3β and/or 17α-hydroxy-19-halo compounds (II: R=hydroxy; R$^2$=H). The free 3β-hydroxyl may in turn be conventionally esterified with an acylating agent, such as propionic or caproic anhydrides in pyridine, to give the corresponding 3β-acylates, wherein the acyl group may be the same or different from the one previously saponified.

The 17α-hydroxyl group may be conventionally esterified in the presence of p-toluenesulfonic acid, with an acylating agent such as an anhydride derived from a hydrocarbon carboxylic acid of the type defined hereinbefore, thus affording the corresponding 17α-esters, wherein the acyl group may or may not be different from the previously saponified group.

The 19-halo-16α,17α-ketonide compounds

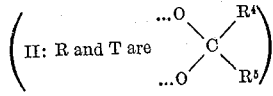

may be converted into the corresponding 19-halo-16α,17α-diols (III: $R^3=R^6=H$) by conventional treatment with formic acid.

The 16α-hydroxyl group of the resulting diol is acylated under the same conditions as the 3β-hydroxyl group.

The following specific examples serve to illustrate, but are not intended to limit the scope of the present invention:

PREPARATION 1

A mixture of 6.6 g. of 16β-methyl-pregnenolone, 2.7 g. of p-toluenesulfonic acid and 300 cc. of acetic anhydride was submitted to a slow distillation; during 5 hours. The residue was cooled and poured into iced water. The product was then extracted with ether, the extract washed successively with an aqueous solution of sodium carbonate and water to neutral, dried and evaporated to dryness. The residue consisted of 3β,20-diacetoxy-16β-methyl-$\Delta^{5,17(20)}$-pregnadiene, which was utilized in the following step without purification.

6 g. of this crude 3β,20-diacetoxy compound were treated with 480 cc. of a 1.2 molar solution of perbenzoic acid in benzene (2.2 molar equivalents) at room temperature and in the dark, for 20 hours. Water was then added, the organic layer separated, washed with an aqeous solution of sodium bicarbonate, then with water, dried with anhydrous sodium sulfate and evaporated to dryness. The residue consisted of the crude 3β,20β-diacetoxy-16β-methyl-5α,6α;17α,20α-bis-oxido-pregnane.

This crude oxido compound was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding 16β-methyl-5α,6α-oxido-pregnane-3β,17α-diol-20-one 3-acetate.

To 5 g. of the latter compound in 80 cc. of glacial acetic acid, there was added a mixture of 5 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C. The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 16β-methyl-$\Delta^5$-pregnene-3β,17α-diol-20-one 3-acetate.

To a solution of 4.5 g. of the latter steroid in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 16β-methyl-$\Delta^5$-pregnene-3β,17α-diol-20-one diacetate.

A suspension of 2.5 g. of the foregoing diacetate in 50 cc. of dioxane was treated with 3 cc. of 1 N perchloric acid and then with 1 g. of N-bromoacetamide. The N-bromoacetamide was added portionwise, with stirring, in the course of 1 hour, in the dark and maintaining the temperature around 15° C. The mixture was stirred for 1 hour further in the dark at room temperature and then decolorized by the addition of 10% aqueous sodium bisulfite solution, 1 lt. of water was added and the product was extracted with methylene chloride. The extract was washed with water, dried over anhydrous sodium sulfate and the solvent was evaporated under reduced pressure and at room temperature. Recrystallization from methylene-chloride-hexane furnished 5α-bromo-16β-methyl-pregnane-3β,6β,17α-triol-20-one 3,17-diacetate.

To a solution of 2 g. of the latter 5α-bromo compound in 75 cc. of dry benzene were added 3 g. of lead tetraacetate and the mixture was refluxed for 18 hours. It was then cooled, filtered, diluted with water and the benzene layer was separated, washed with water and the benzene was evaporated under reduced pressure. By chromatography of the residue on neutral alumina there was obtained the 5α-bromo-16β-methyl-6β,19-oxido-pregnane-3β,17α-diol-20-one diacetate.

A mixture of 1 g. of the last named steroid, 5 g. of zinc dust and 50 cc. of ethanol was refluxed for 16 hours. It was then filtered through celite and the filtrate evaporated to dryness. Crystallization of the residue from acetone-hexane yielded 16β-methyl-$\Delta^5$-pregnene-3β,17α,19-triol-20-one 3,17-diacetate.

Example I

To a solution of 5 g. of $\Delta^5$-pregnene-3β,19-diol-20-one 3-acetate (obtained in accordance with my U.S. patent application Serial No. 194,716, filed of even date, now U.S. Patent No. 3,065,228), in 25 cc. of methylene chloride were added 5 g. of 2-chloro-1,1,2-trifluoro-triethylamine (Yarovenko et al., Journal of General Chemistry of the U.S.S.R., 2125, 29 (1959)). 15 cc. of the solvent were evaporated under anhydrous conditions and the resulting mixture was kept overnight at room temperature. The reaction mixture was evaporated to dryness and the residue was chromatographed on alumina, thus yielding compound No. 1, namely 19-fluoro-$\Delta^5$-pregnen-3β-ol-20-one acetate.

Following the same procedure, the starting compounds under A (obtained in accordance with the aforesaid patent application) were converted into the products under B.

| A | Compound No. | B |
|---|---|---|
| 16α-methyl-$\Delta^5$-pregnene-3β,19-diol-20-one 3-acetate. | 2 | 19-fluoro-16α-methyl-$\Delta^5$-pregnen-3β-ol-20-one acetate. |
| 16β-methyl-$\Delta^5$-pregnene-3β,19-diol-20-one 3-acetate. | 3 | 19-flouro-16β-methyl-$\Delta^5$-pregnen-3β-ol-20-one acetate. |
| 16α,17α-isopropylidenedioxy-$\Delta^5$-pregnene-3β,19-diol-20-one 3-acetate. | 4 | 19-fluoro-16α,17α-isopropylidenedioxy-$\Delta^5$-pregnen-3β-ol-20-one acetate. |
| $\Delta^5$-pregnene-3β,17α,19-triol-20-one 3,17-diacetate. | 5 | 19-fluoro-$\Delta^5$-pregnene-3β,17α-diol-20-one diacetate. |
| 16α-methyl-$\Delta^5$-pregnene-3β,17α,19-triol-20-one 3,17-diacetate. | 6 | 19-fluoro-16α-methyl-$\Delta^5$-pregnen-3β,17α-diol-20-one diacetate. |
| 16β-methyl-$\Delta^5$-pregnene-3β,17α-19-triol-20-one 3,17-diacetate. | 7 | 19-fluoro-16β-methyl-$\Delta^5$-pregnene-3β,17α-diol-20-one diacetate. |

Example II

A solution of 5 g. of $\Delta^5$-pregnene-3β,19-diol-20-one 3-acetate in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 19-tosylate of the starting compound.

A mixture of 4 g. of the crude tosylate, 4 g. of dry lithium chloride and 50 cc. of dimethyl formamide was refluxed for 1 hour. The mixture was then poured into water, the formed precipitate filtered off and crystallized from acetone-hexane to give 19-chloro-Δ⁵-pregnen-3β-ol-20-one acetate (compound No. 8).

When applying the above procedures to the starting compounds under A of Example I, there were respectively produced:

Compound No.:
9. 19 - chloro-16α-methyl-Δ⁵-pregnen-3β-ol-20-one acetate
10. 19-chloro-16β-methyl-Δ⁵-pregnen-3β-ol-20-one acetate
11. 19 - chloro-16α,17α-isopropylidenedioxy-Δ⁵-pregnen-3β-ol-20-one acetate.
12. 19-chloro-Δ⁵-pregnene-3β,17α-diol-20-one diacetate
13. 19 - chloro-16α-methyl-Δ⁵-pregnene-3β,17α-diol-20-one diacetate
14. 19 - chloro-16β-methyl-Δ⁵-pregnene-3β,17α-diol-20-one diacetate

*Example III*

A solution of 0.17 g. of potassium hydroxide in 0.2 cc. of water and 2.5 cc. of methanol was added over 30 minutes to a boiling solution of 1 g. of 19-fluoro-Δ⁵-pregnen-3β-ol-20-one acetate (compound No. 1) in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced compound No. 15, namely, 19-fluoro-Δ⁵-pregnen-3β-ol-20-one.

When applying the above procedure to the compounds Nos. 2 to 14 inclusive, there were respectively obtained:

Compound No.:
16. 19-fluoro-16α-methyl-Δ⁵-pregnen-3β-ol-20-one
17. 19-fluoro-16β-methyl-Δ⁵-pregnen-3β-ol-20-one
18. 19 - fluoro-16α,17α-isopropylidenedioxy-Δ⁵-pregnen-3β-ol-20-one
19. 19-fluoro-Δ⁵-pregnene-3β,17α-diol-20-one
20. 19 - fluoro-16α-methyl-Δ⁵-pregnene-3β,17α-diol-20-one
21. 19 - fluoro-16β-methyl-Δ⁵-pregnene-3β,17α-diol-20-one
22. 19 - chloro-Δ⁵-pregnen-3β-ol-20-one
23. 19 - chloro-16α-methyl-Δ⁵-pregnen-3β-ol-20-one
24. 19 - chloro-16β-methyl-Δ⁵-pregnen-3β-ol-20-one
25. 19 - chloro-16α,17α-isopropylidenedioxy-Δ⁵-pregnen-3β-ol-20-one
26. 19 - chloro-Δ⁵-pregnene-3β,17α-diol-20-one
27. 19 - chloro-16α-methyl-Δ⁵-pregnene-3β,17α-diol-20-one
28. 19 - chloro-16β-methyl-Δ⁵-pregnene-3β,17α-diol-20-one

*Example IV*

A mixture of 1 g. of 19-fluoro-Δ⁵-pregnen-3β-ol-20-one (compound No. 15), 4 cc. of pyridine and 2 cc. of caproic anhydride was kept at room temperature overnight, poured into ice water, the formed precipitate was filtered, washed with water and dried. Crystallization from acetone-hexane gave 19-fluoro-Δ⁵-pregnen-3β-ol-20-one caproate (compound No. 29).

By the same procedure there were treated 19-fluoro-16α-methyl-Δ⁵-pregnene-3β,17α-diol-20-one (cpd. No. 20) and 19-chloro-16α-methyl-Δ⁵-pregnene-3β,17α-diol-20-one (cpd. No. 27), thus yielding respectively: 19-fluoro-16α-methyl-Δ⁵-pregnene-3β,17α-diol-20-one 3-caproate (cpd. No. 30) and 19-chloro-16α-methyl-Δ⁵-pregnene-3β,17α-diol-20-one 3-caproate (cpd. No. 31).

*Example V*

To a solution of 5 g. of compound No. 30 obtained in accordance with Example IV, in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19 - fluoro-16α-methyl-Δ⁵-pregnene-3β,17α-diol-20-one 3-caproate-17-propionate (cpd. No. 32).

By the same procedure, cpd. No. 31 of Example IV was converted into 19-chloro-16α-methyl-Δ⁵-pregnene-3β,17α-diol-20-one 3-caproate-17-propionate (cpd. No. 33).

*Example VI*

1 g. of 19-fluoro-16α,17α-isopropylidenedioxy-Δ⁵-pregnen-3β-ol-20-one (cpd. No. 18) was heated on the steam bath with 20 cc. of 60% formic acid for 1 hour, cooled, diluted with water and the precipitate was collected, washed with water, dried and recrystallized from acetone-hexane, thus affording 19-fluoro-Δ⁵-pregnene-3β,16α,17α-triol-20-one (cpd. No. 34).

By the same procedure the compound No. 25 set forth in Example III was converted into: 19-chloro-Δ⁵-pregnene-3β,16α,17α-triol-20-one (cpd. No. 35).

*Example VII*

The compounds Nos. 34 and 35 treated in accordance with Example IV, thus affording respectively: 19-fluoro-Δ⁵-pregnene-3β,16α,17α-triol-20-one 3,16-dicaproate (cpd. No. 36) and 19-chloro-Δ⁵-pregnene-3β,16α,17α-triol-20-one 3,16-dicaproate (cpd. No. 37).

*Example VIII*

The compounds Nos. 36 and 37 were treated according to Example V, thus yielding correspondingly: 19-fluoro-Δ⁵-pregnene-3β,16α,17α-triol-20-one 3,16 - dicaproate-17-propionate (cpd. No. 38) and 19-chloro-Δ⁵-pregnene-3β,16α,17α-triol-20-one 3,16-dicaproate-17-propionate (cpd. No. 39).

*Example IX*

Using exactly the same conditions as described in Example II, except that lithium chloride was substituted by lithium fluoride, there were obtained compounds Nos. 1 to 7, inclusive, set forth in Example I.

*Example X*

Δ⁵-pregnene-3β,19-diol-20-one 3-acetate was converted into the corresponding crude 19-tosylate by the procedure described in Example II.

The crude tosylate was dried in vacuum, dissolved in 20 cc. of acetonitrile and treated dropwise with 1.4 g. of silver fluoride dissolved in 3 cc. of water. After a short time, silver iodide started to separate leaving the 19-fluoropregnan derivative in solution. The mixture was kept for 24 hours at room temperature and filtered. Concentration of the filtrate under vacuum gave a crude product which after crystallization from methanol-acetone yielded 19-fluoro-Δ⁵-pregnen-3β-ol-20-one acetate (cpd. No. 1).

By the same procedure, there were obtained the compounds Nos. 2 to 7 inclusive.

I claim:
1. A compound of the following formula:

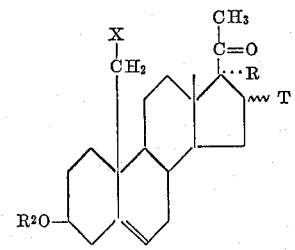

wherein R is selected from the group consisting of hydrogen, hydroxyl and a hydrocarbon carboxylic acyloxy group of less than 12 carbon atoms; T is a member of the group consisting of hydrogen, α-hydroxy, α-hydrocarbon carboxylic acyloxy of less than 12 carbon atoms, α-methyl and β-methyl; T and R together represent the group

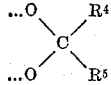

wherein $R^4$ and $R^5$ each represent lower alkyl; and $R^2$ is selected from the group consisting of hydrogen and a hydrocarbon carboxylic acyl group of less than 12 carbon atoms; and X is selected from the group consisting of chlorine and fluorine.

2. 19-fluoro-$\Delta^5$-pregnen-3β-ol-20-one.
3. 19-fluoro-$\Delta^5$-pregnen-3β,16α,17α-triol-20-one.
4. 19-chloro-$\Delta^5$-pregnen-3β,16α,17α-triol-20-one.
5. 19-fluoro-16α-methyl-$\Delta^5$-pregnen-3β-ol-20-one.
6. 19-fluoro-16β-methyl-$\Delta^5$-pregnen-3β-ol-20-one.
7. 19-fluoro-16α,17α-isopropylidenedioxy$\Delta^5$-pregnen-3β-ol-20-one.
8. 19-fluoro-$\Delta^5$-pregnene-3β,17α-diol-20-one.
9. 19-fluoro-16α-methyl-$\Delta^5$-pregnene-3β,17α-diol-20-one.
10. 19-fluoro-16β-methyl-$\Delta^5$-pregnene-3β,17α-diol-20-one.
11. 19-chloro-$\Delta^5$-pregnen-3β-ol-20-one.
12. 19-chloro-16α-methyl-$\Delta^5$-pregnen-3β-ol-20-one.
13. 19-chloro-16β-methyl-$\Delta^5$-pregnen-3β-ol-20-one.
14. 19-chloro-16α,17α-isopropylidenedioxy-$\Delta^5$-pregnen-3β-ol-20-one.
15. 19-chloro-$\Delta^5$-pregnene-3β,17α-diol-20-one.
16. 19-chloro-16α-methyl-$\Delta^5$-pregnene-3β,17α-diol-20-one.
17. 19-chloro-16β-methyl-$\Delta^5$-pregnene-3β,17α-diol-20-one.

No references cited.